Patented Dec. 5, 1933

1,938,032

UNITED STATES PATENT OFFICE 1,938,032

MANUFACTURE OF ARTIFICIAL THREADS AND OTHER PRODUCTS FROM CELLULOSE COMPOUNDS

Leon Lilienfeld, Vienna, Austria

No Drawing. Application March 7, 1931, Serial No. 521,021, and in Great Britain March 10, 1930

16 Claims. (Cl. 18—54)

The present invention concerns the manufacture of artificial materials and represents a modification of the invention described in my U. S. application Ser. No. 435,649 filed March 13, 1930. In that application I have described and claimed the production of artificial materials, particularly artificial threads, having a high degree of tenacity in the dry or wet state and also a satisfactory extensibility by contacting cellulose xanthate with a halogen derivative of a divalent or polyvalent alcohol or with a halogen derivative of an anhydride of a divalent or polyvalent alcohol, such as epichlorohydrin, thereafter giving the solution or paste thus obtained the form of an artificial material, for instance of a thread, and finally bringing the so shaped solution or paste into contact with one or several agents which have a coagulating effect upon the solution or paste and a plasticising effect upon the freshly coagulated artificial material, and particularly $H_2SO_4$ of at least 35% concentration, thereby forming artificial materials (e. g. artificial threads) having high strength and also having a sufficiently high degree of extensibility. Or the shaped material may first be contacted with a coagulating bath and then with a plasticizing bath.

As a result of further investigation and research, in some cases, I may consider it desirable to isolate the product of the reaction of the cellulose xanthate with one or more halogen derivatives before it is worked up into the artificial material, and in such a process, care must be taken to avoid the complete splitting off of the CSS-group.

The isolation of the materials in question is effected, for example, by cautiously adding a dilute inorganic acid, a solution of an acid salt, an alcohol or the like which causes precipitation, or by bringing about spontaneous separation or by salting out the respective products. When inorganic acids or the like are used as precipitants, the precipitate, after being quickly washed, must be re-dissolved soon after washing and the solution can be worked up into artificial materials. Alternatively the precipitated body may be re-converted into a soluble xanthate and the solution thus produced may be worked up into artificial materials.

The process of the present invention can be carried out by adding the desired halogen derivative to the viscose, the reaction product, after neutralization if desired, is allowed to precipitate (which occurs according to the degree of dilution and the rate of stirring, in the form of a uniform jelly or a lumpy or a finely divided form), the precipitated body is dissolved (if necessary after having been washed) in caustic alkali solution, and then converted into an artificial material. Alternatively the precipitated body may be re-converted into a soluble xanthate (by treatment with alkali and $CS_2$) and the resulting solution can be worked up into artificial materials.

Instead of viscose, one of the other cellulosic compounds containing the CSS-group, for instance, a cellulose-xantho-fatty acid or cellulose dixanthate may be used as the initial material.

The invention is further illustrated by the following examples; it will, of course, be understood that it is not in any way restricted to the proportions given nor to the particular manner of working, which can be varied within wide limits. The parts are by weight.

I (a) to (i)

(a) 100 parts of wood-pulp (water content 8 per cent.) or cotton linters (water content 6 to 7 per cent.) are introduced into 2000 parts of caustic soda solution of 18 per cent. strength at a temperature of 15° C. and left therein for 3 hours. The alkali cellulose is then pressed until it weighs in the case of wood-pulp 300 parts and in the case of linters 340 parts; it is shredded at a temperature of 11 to 15° C. for 2½ to 3 hours, whereupon in the case of wood-pulp 40 parts and in the case of linters 60 parts of carbon bisulphide are added, and the carbon bisulphide is allowed to act for about 8 hours at a temperature of 18 to 20° C. Any excess of carbon bisulphide is blown off during 10–15 minutes and the thus obtained xanthate (weight about 395 parts) is dissolved in 1605 parts of water while kneading.

The thus obtained viscose is now diluted with 8000 parts of water while stirring, whereupon 650 parts by volume of acetic acid of 10 per cent. strength are added within 2 minutes and the neutralized viscose stirred for another three-quarters of an hour in order to remove the greater part of the liberated $H_2S$.

After this time 50 parts of α-dichlorhydrin are added while stirring and the temperature kept at 16° C.

After 21 hours the reaction mass becomes slightly jellified, and after 26 hours the reaction product precipitates in the form of a finely divided substance which settles, the supernatant mother liquor being clear in most cases. The precipitated body is separated from the mother liquor (the reaction of the latter is neutral) by decanting the mother liquor through a straining cloth, whereupon the precipitate is washed on the straining cloth until the water remains practically clear on addition of a solution of AgNO₃.

The precipitate is now freed from the greater part of the adhering water by pressing and then dried at room temperature after having been purified by extraction with alcohol and ether. The weight of the dried body amounts to 106 parts.

The dried body (a finely divided yellowish powder) is now stirred into 2000 parts of a caustic soda solution of 18 per cent. strength at 15° C., and the reaction mixture allowed to stand for three hours at 17° C. After that time the excess of the caustic soda solution is removed by pressing until the cake weighs 380 parts. To the comminuted pressed cake 60 parts of carbon bisulphide are added, and the mass kept in a well closed vessel for 10 hours at 20° C. The thus obtained xanthate is dissolved in 820 parts of a caustic soda solution of 5 per cent. strength. The highly viscous solution is now diluted by adding 179 parts of a caustic soda solution of 8 per cent. strength.

The solution is now filtered three times through cotton, two filtrations being carried out soon after its preparation, while the third immediately precedes the spinning process. Before the solution is spun, it is left to age for 96 to 100 hours at a temperature of 15° C.

The spinning solution is pressed at a speed of 3.3 ccm. per minute through a platinum nozzle having 54 perforations of 0.1 mm. diameter, into a bath containing 65 per cent. of $H_2SO_4$ and having a temperature of 16° C., the length of immersion of the thread in the sulphuric acid being 20 cm.

The thread is then allowed to pass for 120 cm. through the air and is wound on a bobbin revolving at a speed which produces a speed of spinning of about 18 m. per minute. Three glass rods are placed angularly to one another between the spinning bath and the bobbin over which rods the threads are conducted and are thus subjected to an additional stretching or tension. The lower part of the bobbin revolves in water, so that the sulphuric acid is removed or considerably diluted as soon as the thread arrives at the bobbin. The threads are then washed, purified, dried, twisted and finished in the usual manner.

The threads obtained consist of single filaments of about 2 to 2.5 deniers each.

(b) The same mode of operation as in (a) but with the variation that the temperature of the spinning bath is 0° C.

(c) The same mode of procedure as in (a) or (b), with the difference that the bath contains 70 per cent. of $H_2SO_4$.

(d) The same mode of operation as in (a), or (b), or (c), but with the difference that only 1.6 ccm. of the spinning solution is discharged per minute, that the nozzles have 100 perforations of 0.08 mm. diameter, and that the spinning bath contains 58 per cent. of $H_2SO_4$.

The titre of the single filaments is about 0.5 to 0.7 denier.

(e) Mode of operation as in (a) or (b) or (c) with the exception that 3 ccm. of the spinning solution are discharged per minute, that the nozzles have 100 apertures of 0.08 mm. diameter, and that the spinning bath contains 58 per cent. of $H_2SO_4$.

The titre of the single filaments is about 0.7 to 0.9 denier.

(f) The same mode of operation as in (a) or (b) or (c) but with the variation that 6.6 ccm. of the spinning solution are discharged per minute, that the nozzles have 100 perforations of 0.08 mm. diameter, that the speed of spinning is 40 m. per minute and that the spinning bath contains 60 per cent. of $H_2SO_4$.

The titre of the single filaments is about 1 to 1.4 denier.

(g) The same mode of operation as in (a), but with the difference that 3 ccm. of the spinning solution are discharged per minute, that the nozzles have 24 perforations of 0.1 mm. diameter, that the setting bath contains 58 per cent. of $H_2SO_4$ and has a temperature of 0° C. and that the length of immersion of the thread in the setting bath is 80 cm.

The titre of the single filament is about 4 to 5.5 denier.

(h) The process is conducted as in (f), but with the difference that the spinning solution is charged at a speed of about 14 ccm. per minute, that the speed of spinning is about 100 to 120 m. per minute, that the thread is not subjected to additional stretching, and that the spinning bath contains 60 per cent. of $H_2SO_4$.

(i) The same procedure as in any of the examples (a) to (h) with the exception that the setting bath contains 40 per cent. of $H_2SO_4$.

II (a) to (i)

The process is conducted exactly as in Example I (a) to (i), but with the difference that instead of 50 parts, only 20 parts of α-dichlorohydrin are employed.

The concentrations of the sulphuric acid in spinning methods (a) to (h) are higher by about 5 to 6 per cent.

III (a) and (b)

(a) The viscose is prepared exactly as in Example I, but with the difference that it is diluted with 4000 parts of water instead of 8000 parts of water. To the diluted viscose, without neutralizing it, 20 parts of α-dichlorohydrin are added while mechanically stirring.

After 74 hours, during which the reaction mass is stirred, the reaction product precipitates and after another 48 hours the precipitate settles. It is now collected on a straining cloth and washed with water until the washing water is perfectly neutral and gives no precipitate with a solution of AgNO₃. The washed residue is now pressed down to 769 parts and then, while cooling by means of ice water, dissolved in 680 parts of caustic soda solution of 16.5 per cent. strength, so that the final spinning solution contains 5.3 per cent. of the cellulosic body analytically determined and 8 per cent. of NaOH.

The solution is then filtered three times through cotton, two filtrations being carried out soon after its preparation, while the third immediately precedes the spinning process. After having aged for about 18 hours at 15° C., the filtered solution is spun as follows:

It is squirted through a nozzle containing 54 perforations of 0.1 mm. diameter into a bath containing 40 per cent. of $H_2SO_4$ and having a temperature of —5° C., the length of immersion of the thread in the sulphuric acid being 20 cm. The thread is then allowed to pass for 165 cm. through the air and wound on a bobbin revolving at a speed which produces a speed of spinning of about 18 m. per minute. The lower part of the bobbin revolves in water, so that the sulphuric acid is removed or considerably diluted as soon as the thread arrives at the bobbin. The threads are then washed, purified, dried, twisted and finished in the usual manner.

The threads obtained consist of single filaments of about 2 to 2.5 deniers each.

(b) Mode of procedure as in (a), but with the exception that the spinning bath has a temperature of 16° C.

The expression "artificial material" used in the specification and claims includes: artificial threads, particularly artificial silk; films; coatings and layers of every kind; dressings for textiles, paper, leather and the like; sizing for yarns; book cloth; artificial leather; adhesives and cements; plates and plastic compositions in general; thickening agents or fixing agents for pigments in textile printing and the like.

What I claim is:—

1. In the manufacture of artificial materials by a method involving the step of acting on a dissolved cellulose compound containing a —CSS group, with a halogen derivative of a polyhydric alcohol, the improvement which consists in isolating the product of the action of such halogen derivative on cellulose xanthate, dissolving the isolated product and converting the material thus obtained into an artificial material by bringing it into the appropriate shape and coagulating the shaped material, and plasticizing it not later than immediately after its coagulation.

2. A process as claimed in claim 1, wherein the product of the action of the halogen derivative on viscose is allowed to precipitate spontaneously, whereupon the precipitated product is dissolved.

3. A process as claimed in claim 1, wherein an agent capable of precipitating the product of reaction is added to the mixture produced by contacting said halogen derivative with viscose, so as to precipitate the product, whereupon the precipitate is washed and subsequently dissolved.

4. A process as claimed in claim 1, wherein an acid material is added to the solution produced by the action of said halogen derivative as a precipitating agent.

5. Process as in claim 1, in which after the action of the halogen derivative of the polyhydric alcohol on the dissolved cellulosic compound, the reaction product of said materials is precipitated from said solution by the addition of a precipitating agent selected from the herein described group consisting of acids, acid salts and alcohols.

6. Process as covered in claim 1 in which the cellulosic compound containing a —CSS group is a cellulose xanthate.

7. Process as covered in claim 1 in which the cellulosic compound containing a —CSS group is a cellulose-xantho-fatty acid compound.

8. Process as covered in claim 1 in which the cellulosic compound containing a —CSS group is a cellulose dixanthate.

9. Process as covered in claim 1 in which the cellulosic compound containing a—CSS group is a substance selected from the herein described group consisting of cellulose xanthate, cellulose dixanthate and cellulose-xantho-fatty acid.

10. A process which comprises acting upon a dissolved celulose derivative containing a —CSS group, with a halogen derivative of a polyhydric alcohol, isolating the cellulosic reaction product and dissolving the isolated product in such proportions as to form a viscous solution, shaping such solution and subjecting same in a shaped condition to a coagulating and plasticizing bath.

11. A process which comprises acting upon a dissolved celulose derivative containing a —CSS group, with a halogen derivative of a polyhydric alcohol, isolating the cellulosic reaction product and dissolving the isolated product in such proportions as to form a viscous solution, shaping such solution and subjecting same in a shaped condition to a coagulating bath and then to a plasticizing bath.

12. A process as in claim 1 in which the isolated material is subjected to re-xanthating prior to being dissolved and shaped into the form of an artificial material.

13. A process as in claim 1 in which a plurality of halogen derivatives, as specified, are added.

14. A process as in claim 1 in which the halogen derivative is a halohydrin.

15. A process as in claim 1 in which the halogen derivative is an epi-halohydrin.

16. A process as in claim 1 in which the isolated material is well washed, before being redissolved.

LEON LILIENFELD